US006465542B1

United States Patent
Torbus et al.

(10) Patent No.: US 6,465,542 B1
(45) Date of Patent: Oct. 15, 2002

(54) BINDER SYSTEM FOR MOULDING MIXTURES FOR THE PRODUCTION OF MOULDS AND CORES

(75) Inventors: Marek Torbus, Krefeld; Gérard P. M. Ladégourdie, Düsseldorf; Dietmar Bartsch, Laatzen; Klaus Seeger, Hannover, all of (DE)

(73) Assignee: Hüttenes-Albertus Chemische Werke GmbH (DE)

( * ) Notice: Subject to any disclaimer, the term of this patent is extended or adjusted under 35 U.S.C. 154(b) by 15 days.

(21) Appl. No.: 09/585,126

(22) Filed: Jun. 1, 2000

(30) Foreign Application Priority Data

Jun. 1, 1999 (DE) .......................................... 199 25 115

(51) Int. Cl.[7] .................................................. B22C 1/22
(52) U.S. Cl. ....................................... 523/143; 523/142
(58) Field of Search ................................ 523/142, 143, 523/139, 145, 147; 524/196, 198, 199, 188

(56) References Cited

U.S. PATENT DOCUMENTS 4,459,374 A * 7/1984 Nishimura et al. ......... 523/143
4,590,229 A * 5/1986 Gardlikes ................... 523/143
5,223,030 A * 6/1993 Valette et al. .............. 106/38.2

FOREIGN PATENT DOCUMENTS

SU          165202 A    *  1/1989

* cited by examiner

Primary Examiner—Edward J. Cain
Assistant Examiner—Kataryna W. Lee
(74) Attorney, Agent, or Firm—Pendorf & Cutliff

(57) ABSTRACT

Two-component binder system with reduced release of aromatic compounds during foundry operations, the system consisting of a phenol resin component and a polyisocyanate component, the phenol resin component comprising a phenol resin having at least two OH groups per molecule and the polyisocyanate component comprising a polyisocyanate having at least two isocyanate groups per molecule, wherein at least the phenol resin component contains a solvent, and wherein at least one of the phenol resin component and the polyisocyanate component comprises a solvent selected from the group consisting of alkyl silicates, alkyl silicate oligomers and mixtures thereof.

16 Claims, 1 Drawing Sheet

BINDER SYSTEM FOR MOULDING MIXTURES FOR THE PRODUCTION OF MOULDS AND CORES

BACKGROUND OF THE INVENTION

FIELD OF THE INVENTION

Figure 1:
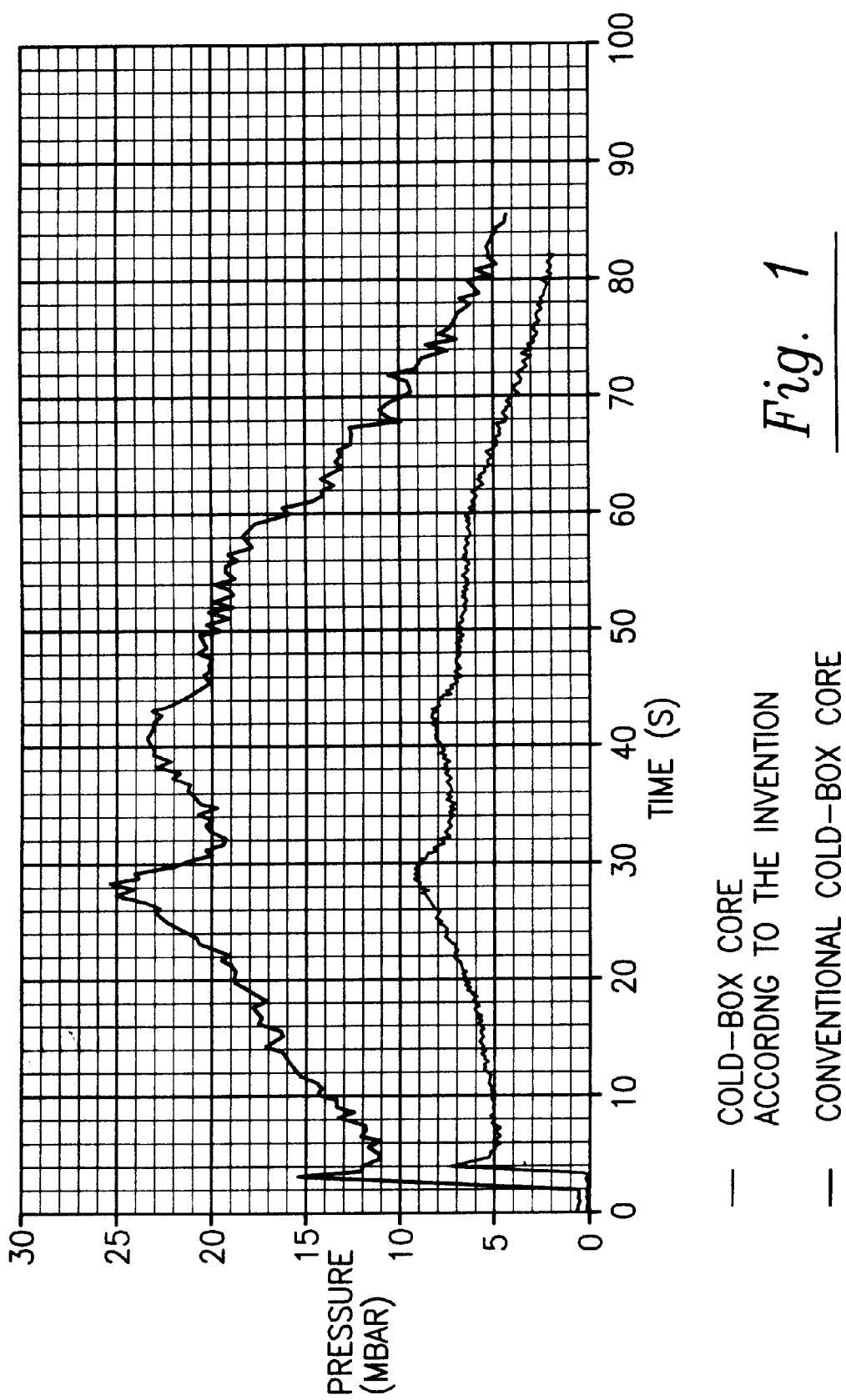

In the production of moulds and cores, polyurethane-based binder systems are used in large amounts, in particular for mould and core production for the cold-box or polyurethane no-bake process.

Polyurethane-based binder systems for the cold-box and for the polyurethane no-bake process typically comprise two essential binder components, namely:
(1) a polyol component which comprises a binder having at least two OH groups per molecule and
(2) a polyisocyanate component which comprises a binder having at least two isocyanate groups per molecule.

These components are optionally solvent-containing and are usually packed and sold in separate containers.

Usually, the polyol component (first component) comprises a phenol resin having at least two OH groups per molecule. Of these, phenol resins of the benzyl ether resin type have become particularly important. These are the condensates of a phenol of the general formula I

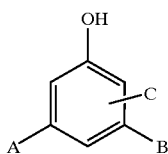

in which A, B and C are hydrogen, alkyl groups or alkoxy groups, with aldehydes of the general formula R'CHO, in which R' is a hydrogen atom or an alkyl group having 1–8 carbon atoms. The reaction of phenols of the stated general formula with aldehydes of the general formula R'CHO is carried out in the liquid phase, typically at a temperature below 130° C. Catalytic amounts of ortho-directing divalent metal ions, such as $Zn^{2+}$, are added to the reaction mixture.

Preferred benzyl ether resins correspond to the following general formula II:

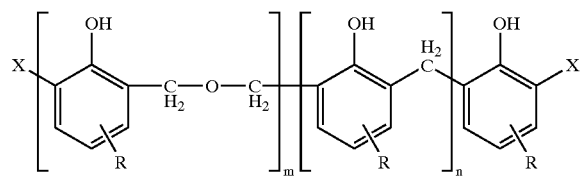

Here, R is hydrogen or a phenolic substituent in the ortho, meta or para position relative to the phenolic hydroxyl group; the sum of m and n is at least 2 and the ratio m/n is at least 1; X is hydrogen or $CH_2OH$, the ratio of hydrogen to $CH_2OH$ being at least 1.

For use in a two-component binder system, phenol resins, in particular benzyl ether resins, are usually used as a solution in an organic solvent. The solvent is required for reducing the viscosity of the phenol resin for mixing with a moulding material and reacting with the polyisocyanate component.

The isocyanate component (second component) of the two-component binder system for the cold-box or polyurethane no-bake process usually comprises an aliphatic, cycloaliphatic or aromatic polyisocyanate having preferably between two and five isocyanate groups; mixtures of such polyisocyanates may also be used. Particularly suitable polyisocyanates among the aliphatic polyisocyanates are, for example, hexamethylene diisocyanate, particularly suitable ones among the alicyclic polyisocyanates are, for example, 4,4'-dicyclohexylmethane diisocyanate and particularly suitable ones among the aromatic polyisocyanates are, for example, 2,4'- and 2,6'-toluene diisocyanate, diphenylmethane diisocyanate and their dimethyl derivatives. Further examples of suitable polyisocyanates are 1,5-naphthalene diisocyanate, triphenylmethane triisocyanate, xylene diisocyanate and their methyl derivatives, polymethylenepolyphenyl isocyanates (polymeric MDI), etc. Although all polyisocyanates react with the phenol resin with formation of a crosslinked polymer structure, the aromatic polyisocyanates are preferred in practice. Diphenylmethane diisocyanate (MDI), triphenylmethane triisocyanate, polymethylene polyphenyl isocyanates (polymeric MDI) and mixtures thereof are particularly preferred.

The polyisocyanate is used in concentrations which are sufficient to effect curing of the phenol resin. In general, 10–500% by weight, preferably 20–300% by weight, based on the mass of (undiluted) phenol resin used, of polyisocyanate are employed. The polyisocyanate is used in liquid form; liquid polyisocyanate can be used in undiluted form, and solid or viscous polyisocyanates are used in the form of a solution in an organic solvent, it being possible for the solvent to account for up to 80% by weight of the polyisocyanate solution.

In choosing the solvents for the phenol resin component and optionally for the polyisocyanate component, it should be noted that although these do not participate in a relevant manner in the reaction between the isocyanate and the phenol resin in the presence of a catalyst, they may very well influence this reaction. One problem arises in particular from the situation that the two binder components phenol resin and polyisocyanate have substantially different polarities. This polarity difference between the polyisocyanate and the phenol resin limits the number of solvents which may be used to those which are compatible with both binder components. Such compatibility is necessary in order to achieve complete reaction and curing of a binder system. Although polar solvents of the protic and aprotic type are usually good solvents for the phenol resin, they are not very suitable for the polyisocyanate. Aromatic solvents in turn are compatible with polyisocyanates but are not very suitable for phenol resins.

In practice, mixtures of polar and nonpolar, aromatic-containing solvents which are tailored to the respective binder system (phenol resin and polyisocyanate) are therefore usually used. Moreover, the individual components of the solvent mixture should not have too low a boiling range, so that the solvent cannot become ineffective too rapidly as the result of evaporation.

Nonpolar, aromatic-containing solvents used to date are preferably mixtures of high-boiling aromatic hydrocarbons, i.e. mixtures of aromatic hydrocarbons having a boiling range above 150° C. at atmospheric pressure. Polar solvents which have been used are, inter alia, specific sufficiently high-boiling esters, such as, for example, the "symmetrical" esters which are described in German Patent 27 59 262 and in which both the acid radical and the alcohol radical have a relatively large number of C atoms (about 6–13 C atoms) in the same range.

With all advantages of the polyurethane binder for casting technology, it is still felt to be a disadvantage that excessively high benzene emissions occur during pouring of a casting in a mould which comprises a binder based on a polyurethane. These benzene emissions during pouring, but also evaporation and devolatilization prior to the pouring, constitute considerable workplace pollution which generally cannot be trapped by protective measures, such as extractor hoods or the like.

SUMMARY OF THE INVENTION

It was therefore the object of the present invention to provide a polyurethane-based binder system for the cold-box and for the polyurethane no-bake process, which binder releases only small amounts of aromatic compounds during foundry operation.

DETAILED DESCRIPTION OF THE INVENTION

According to the invention, this object is achieved by providing a two-component binder system consisting of a phenol resin component and a polyisocyanate component, the phenol resin component comprising a phenol resin having at least two OH groups per molecule and the polyisocyanate component comprising a polyisocyanate having at least two isocyanate groups per molecule, and at least the phenol resin component containing a solvent, wherein the solvent for the phenol resin comprises a substance which is selected from the group which comprises alkyl silicates, alkyl silicate oligomers and mixtures thereof (i.e. mixtures of different alkyl silicates, mixtures of different oligomers and mixtures of alkyl silicate(s) with oligomer(s) and/or the polyisocyanate component contains a solvent which comprises such a substance, i.e. a substance which is selected from the group which comprises alkyl silicates, alkyl silicate oligomers and mixtures thereof.

The amount of alkyl silicates, alkyl silicate oligomers and mixtures thereof in the phenol resin component is advantageously in the range between 1 and 40% by weight.

The amount of alkyl silicates, alkyl silicate oligomers or mixtures thereof in the polyisocyanate component (if this requires a solvent) is advantageously likewise in the range between 1 and 40% by weight.

The invention is based on the surprising discovery that alkyl silicates, i.e. alkyl esters of silicic acid, can be used as a solvent or as a solvent component (firstly) for cold-box phenol resins and polyurethane no-bake phenol resins and/or (secondly) for the polyisocyanates used in the cold-box or polyurethane no-bake process, without there being any disadvantages.

Oligomers of alkyl silicates, e.g. oligomers of tetraalkyl silicates, such as Dynasil 40 (Degussa-Hüls; CAS: 68412-37-3), oligomers of alkyltrialkoxysilanes, oligomers of dialkyldialkoxysilanes and oligomers of trialkylmonoalkoxysilanes can be used in just such a manner, in particular for the phenol resin component.

The phenol resin and the polyisocyanate can be selected from the group consisting of the compounds usually used in the cold-box process or the no-bake process. However, the compounds and groups of compounds mentioned further above are preferred.

It is preferable in particular if the phenol resin component comprises a phenol resin of the benzyl ether type, as described above with reference to the general formula II. When alkyl silicate oligomers are used, it is expedient in individual cases to use an alkylphenol, such as o-cresol, p-nonylphenol or p-tert-butylphenol, in the mixture, in particular with phenol, for the preparation of the phenol resin.

The polyisocyanate component preferably comprises polymeric diphenylmethane diisocyanate (polymeric MDI), advantageously more than half the isocyanate groups in the polyisocyanate component being assigned to the diphenylmethane diisocyanate molecules.

In the group consisting of the alkyl silicates, the tetraalkyl silicates and in particular the tetraethyl silicate have proved particularly suitable solvents. Tetraalkyl silicates, such as tetraethyl silicate, can be used as solvents in the phenol resin component and/or in the polyisocyanate component of a binder system.

Alkyl silicates or alkyl silicate oligomers, in particular tetraalkyl silicates, such as tetraethyl silicate, or corresponding mixtures of alkyl silicate(s) with/or alkyl silicate oligomer(s) can be used together with cosolvents as solvents for the polyisocyanate component; the mass ratio of alkyl silicate (or oligomer or mixture) to cosolvent is usually greater than 1:50, preferably greater than 1:4. In the case of mass ratios of less than 1:50, the presence of the alkyl silicates (or oligomers or corresponding mixtures) in the solvent for the polyisocyanate component has only little effect on the behaviour of the binder system.

Advantageously, it is possible to use an alkyl silicate, an alkyl silicate oligomer or a mixture of alkyl silicate(s) with/or alkyl silicate oligomer(s) as the sole solvent or predominant solvent component (mass ratio of alkyl silicate to cosolvent >1:1) for the polyisocyanate (for example, polymeric MDI).

In particular, tetraethyl silicate or a mixture of tetraethyl silicate with other alkyl silicates or with alkyl silicate oligomers can be used as the sole solvent or predominant solvent component (mass ratio of tetraethyl silicate or mixture to cosolvent >1:1) for the polyisocyanate.

If tetraethyl silicate is used as the sole solvent or predominant solvent component for the polyisocyanate, the mass ratio of polyisocyanate to tetraethyl silicate in the polyisocyanate component should be in the range between 95:5 and 65:35.

The solvent for the phenol resin preferably consists of (a) alkyl silicate, alkyl silicate oligomer or a corresponding mixture of alkyl silicate(s) with/or alkyl silicate oligomer(s) and (b) a cosolvent.

The mass ratio of alkyl silicate (or oligomer or mixture) to cosolvent may vary within wide limits and is usually between 1:60 and 5:1, preferably between 1:44 and 35:10. A preferred alkyl silicate in turn is tetraethyl silicate.

Additives increasing the polarity of the solvent are preferably used as cosolvent for the phenol resin. Numerous polar compounds are suitable for this purpose, for example a mixture of dimethyl esters of $C_4$–$C_6$-dicarboxylic acids, referred to as "dibasic ester" or "DBE" for short.

Alternatively, the methyl monoesters of one or more fatty acids having a carbon chain from 12 C atoms, described in our own EP 0 771 559 A 1, can be used as cosolvent, for example rapeseed oil methyl ester.

Also as an alternative, every other solvent customary for phenol resin component of a two-component binder system can also be used as cosolvent in addition to alkyl silicate, alkyl silicate oligomer or a corresponding mixture. The person skilled in the art can determine the suitable mixing ratios in the specific case on the basis of a few preliminary experiments.

Although the use of aromatic compounds as cosolvents for the phenol resin (or polyisocyanate) component is not ruled out in principle, for ecological reasons it is clearly preferable completely to dispense with aromatic compounds in the solvents for the phenol resin and the polyisocyanate component. For the use of the alkyl silicate-containing solvents according to the invention, this is possible without disadvantages in the production of moulds and cores and in the casting thereof. This is to be regarded as substantial progress compared with the binder systems used to date in practice.

The use of alkyl silicates (such as tetraalkyl silicate) or alkyl silicate oligomers as a solvent (or solvent component) for the phenol resin and/or polyisocyanate component of a two-component binder system for the cold-box and for the polyurethane no-bake process is advantageous not only from the ecological point of view. From the technological point of view, too, the use of alkyl silicates or alkyl silicate oligomers is beneficial. In particular, the thermal stability of moulds and cores in the production of which binder systems according to the invention were used is particularly high. In addition, such moulds and cores are distinguished by lower gas pressure generation compared with conventional moulds and cores during casting.

Particularly high strengths are obtained if tetraethyl silicate is the main component of the solvent for the phenol resin and, if necessary, the sole solvent for the polyisocyanate component. Based on the solvent used altogether, the amount of alkyl silicate (or tetraalkyl silicate), alkyl silicate oligomer or corresponding mixtures should however exceed the amount of aromatic solvent components in every case.

A number of particularly preferred (and optionally substituted) alkyl (ortho)silicates are shown in the Table below, beginning with the preferred tetraalkyl silicates:

Table 1

Tetraalkyl silicates: Tetraethyl (ortho)silicate; tetra-n-propyl silicate

Trialkyl silicates: Triethyl silicate; trialkyl silicates (in particular triethyl silicates) having an aryl function on the fourth oxygen atom (Si—O—Ar; Ar=aryl radical)

Dialkyl silicates: Diethyl silicate; dialkyl silicates having an aryl function on the third and/or fourth oxygen atom (Si—O—Ar)

Monoalkyl silicates: Monoethyl silicate; monoalkyl silicates having an aryl function on the second and/or third and/or fourth oxygen atom (Si—O—Ar)

Substituted silicates:

a) Aryl- or alkylalkoxysilanes, i.e. compounds of the type $R^1_{n=1-3}Si(OR^2)_{m=4-n}$ with $R^1$=alkyl or aryl radical and $R^2$ =alkyl radical; e.g. dimethyldimethoxysilane ($R^1$= $CH_3$; n=2; $R^2$=$CH_3$, m=4−n=2);

b) organofunctional silanes, i.e. compounds of the type $R^1_{n=1-3}Si(OR^2)_{m=4-n}$ with $R^1$=functional group, such as 3-aminopropyl or 3-ureidopropyl or 3-glycidyloxypropyl and $R^2$=alkyl radical; e.g. 3-aminopropyltriethoxysilane, 3-ureidopropyltriethoxysilane or 3-glycidyloxypropyltrimethoxysilane.

The examples which follow are intended to illustrate the invention without restricting it. The term "pbw" used in the Examples means parts by weight (parts by mass). Trade names are indicated by an "(R)" superscript.

EXAMPLE 1
Preparation of a Preferred Phenol Resin of the Benzyl Ether Type (Precondensate)

In a reaction vessel which was equipped with condenser, thermometer and stirrer,
  385.0 pbw of phenol
  176.0 pbw of paraformaldehyde (as formaldehye source) and
  0.11 pbw of zinc acetate were initially introduced. The condenser was set up for reflux. The temperature was increased continuously to 105° C. in the course of one hour and kept at this temperature for two to three hours, until a refractive index of 1.550 had been reached.

The condenser was then converted for atmospheric distillation and the temperature was increased to 125–126° C. in the course of one hour, until the refractive index of about 1.593 had been reached.

A vacuum distillation to a refractive index of 1.612 was then carried out.

The yield was 82–83% of the raw materials used.

This phenol resin was used for the production of test specimens by the cold-box process (Example 4) and also for the production of test specimens by the polyurethane no-bake process (Example 8).

EXAMPLE 2
Preparation of Cold-box Phenol Resin Solutions

Resin solutions for the cold-box process, which had the compositions stated below, were prepared from the phenol resin (precondensate) according to Example 1 after the required refractive index value had been reached:

According to the invention, cold-box resin solutions HA 1–HA 5

Resin solution HA 1
  55 pbw of phenol resin (precondensate)
  30 pbw of tetraethyl silicate
  14.7 pbw of DBE ("Dibasic Ester")
  0.3 pbw of aminosilane or amidosilane Resin solution HA 2
  55 pbw of phenol resin (precondensate)
  35 pbw of tetraethyl silicate
  9.7 pbw of DBE
  0.3 pbw of aminosilane or amidosilane Resin solution HA 3
  55 pbw of phenol resin (precondensate)
  15 pbw of tetraethyl silicate
  29.7 pbw of DBE
  0.3 pbw of aminosilane or amidosilane Resin solution HA 4
  55 pbw of phenol resin (precondensate)
  1 pbw of tetraethyl silicate
  43.7 pbw of DBE
  0.3 pbw of aminosilane or amidosilane Resin solution HA 5
  55 pbw of phenol resin (precondensate)
  5 pbw of tetraethyl silicate
  44.7 pbw of DBE
  0.3 pbw of aminosilane or amidosilane Conventional for comparison: cold-box resin solution HB 1
  51 pbw of phenol resin (precondensate)
  10 pbw of isophorone
  8 pbw of Plastomoll DOA
  11 pbw of triacetin
  20 pbw of Solvesso 150 ($C_{11}$–$C_{13}$ aromatics mixture)
  0.3 pbw of aminosilane or amidosilane EXAMPLE 3
Preparation of Polyisocyanate Solutions for the Cold-box Process According to the invention: polyisocyanate solutions AA 1–AA 2

Polyisocyanate solution AA 1
  80 pbw of diphenylmethane diisocyanate
  19.8 pbw of tetraethyl silicate (sole solvent)
  0.2 pbw of acid chloride (additive for increasing the lifetime of the sand)
Polyisocyanate solution AA 2
  70 pbw of diphenylmethane diisocyanate
  29.8 pbw of tetraethyl silicate (sole solvent)
  0.2 pbw of acid chloride (additive for increasing the lifetime of the sand)
Conventional for comparison: Polyisocyanate solution AB 1
  80 pbw of diphenylmethane diisocyanate
  19.7 pbw of Shellsol R (solvent; contains about 85% of aromatic compounds)
  0.3 pbw of acid chloride (additive for increasing the lifetime of the sand)

EXAMPLE 4

Production of Cold-box Test Specimens and Core Testing Thereof a) Using the above-mentioned phenol resin and polyisocyanate solutions (cf. Examples 2 and 3), the foundry sand mixture shown in Tables 2a and 2b below were prepared by mixing in each case
  100 pbw of quartz sand H 32,
  0.8 pbw of the respective phenol resin solution (Example 2) and
  0.8 pbw of the respective polyisocyanate solution (Example 3)
in a vibratory mixer.

The mixing time was 60 s in each case. With the mixtures obtained, test specimens (+GF+ Riegel) were shot at a shot pressure of 4 bar and were then gassed for 10 s at a gassing pressure of 4 bar with dimethylisopropylamine and then flushed with air for 10 s. The amount of sand per test specimen was 3 kg, the sand temperature and the room temperature were about 25° C. and the relative humidity (RH) was about 39%.

The bending strengths of the test specimens thus obtained were then determined by the GF method.

In the production of the test specimens and in the testing of the bending strengths, the specifications of VDG Data Sheet P 73 of February 1996 were followed.

In Table 2a, the strength values of five cores according to the invention and one conventional core are first compared (in $N/cm^2$).

In Table 2b, the strength values of four further cores according to the invention are shown (in $N/cm^2$); the strength values of the conventional core from Table 2a are once again shown for comparison purposes.

For the results summarized in Tables 2a and 2b, investigations were carried out on the one hand with a mixture processed immediately after mixing to give a moulded test specimen (column headed "IMMEDIATE") and, on the other hand, with a mixture first stored for one hour after mixing (for assessing the so-called "lifetime of the sand") and then processed to give a moulded test specimen (column headed "1 HOUR").

The bending strengths of the respective test specimens were determined immediately after gassing (sub-columns "imm."; initial strength) and one hour (sub-columns "1 H") or 24 hours (sub-columns "24 h"; final strength) after gassing.

b) In Table 2a, in the columns denoted with letters A–F, some performance characteristics of the cores according to the invention (with phenol resin solution HA 1–HA 5 and polyisocyanate solution AA 1) are additionally illustrated in comparison with the conventional core (phenol resin solution HB 1, polyisocyanate solution AB 1). For this purpose, six different series of tests were carried out, namely:

Series A: Cores (test specimens) stored for 1 day in the laboratory were immersed in water on the next day, air-dried, tested after 1 day (sub-column "1 d") or 2 days ("2 d").

Series B: Cores immersed in blackwash immediately after preparation, air-dried, tested after 1 or 2 days ("1 d" or "2 d").

Series C: Cores stored in the laboratory for 1 day, immersed in blackwash on the next day, dried for 1 hour in an oven at 150° C., tested after cooling (*).

Series D: Cores immersed in blackwash immediately after preparation, dried for 1 hour in an oven at 150° C., tested after cooling Series E: Cores stored in a laboratory for 1 day, then stored for 1 or 2 days ("1 d" or "2 d") at over 95% relative humidity, then tested.

Series F: Cores stored at over 95% relative humidity for 1 or 2 days ("1 d" or "2 d"), then tested.

The results summarized in Tables 2a and 2b below show that some of the test specimens (cores) produced according to the invention have even better strength values than the cores produced in the conventional manner.

However, the essential difference compared with the conventional core is that the cores according to the invention no longer cause any detectable workplace pollution during their production and also during pouring. The behaviour during pouring has been confirmed by test castings carried out in the laboratory, as shown by Example 5 below.

TABLE 2a

| | | Bending strengths | | | | | | | | | | | | | | | |
|---|---|---|---|---|---|---|---|---|---|---|---|---|---|---|---|---|---|
| Further processing of the mixture | | | | | | | | | | | | | | | | | |
| | Test time | IMMEDIATE | | | 1 HOUR | | | A | | B | | C | D | E | | F | |
| Phenol resin | Polyisocyanate | imm. | 1 h | 2 h | imm. | 1 h | 24 h | 1 d | 2 d | 1 d | 2 d | * | * | 1 d | 2 d | 1 d | 2 d |
| HA 1 | AA 1 | 340 | 550 | 650 | 280 | 480 | 620 | 640 | 670 | 650 | 600 | 770 | 530 | 570 | 420 | 550 | 540 |
| HA 2 | AA 1 | 280 | 450 | 580 | 240 | 520 | 600 | 540 | 590 | 580 | 580 | 720 | 560 | 460 | 120 | 460 | 430 |
| HA 3 | AA 1 | 320 | 450 | 550 | 270 | 450 | 560 | 580 | 550 | 350 | 440 | 650 | 390 | 440 | 390 | 400 | 400 |
| HA 4 | AA 1 | 200 | 350 | 420 | 210 | 380 | 460 | 280 | 230 | 250 | 220 | 270 | 240 | 240 | 120 | 280 | 210 |

TABLE 2a-continued

Bending strengths

Further processing of the mixture

| | | Test time | IMMEDIATE | | | 1 HOUR | | | A | | B | | C | D | E | | F | |
|---|---|---|---|---|---|---|---|---|---|---|---|---|---|---|---|---|---|---|
| Phenol resin | Polyisocyanate | imm. | 1 h | 2 h | imm. | 1 h | 24 h | 1 d | 2 d | 1 d | 2 d | * | * | 1 d | 2 d | 1 d | 2 d |
| HA 5 | AA 1 | 220 | 330 | 430 | 220 | 380 | 450 | 430 | 400 | 340 | 360 | 400 | 340 | 270 | 190 | 260 | 240 |
| HB 1 | AB 1 | 240 | 500 | 570 | 220 | 500 | 600 | 540 | 560 | 550 | 540 | 550 | 550 | 500 | 520 | 490 | 500 |

TABLE 2b

Bending strengths

Further processing of the mixture

| | | Test time | IMMEDIATE | | | 1 HOUR | | |
|---|---|---|---|---|---|---|---|---|
| Phenol resin | Polyisocyanate | imm. | 1 h | 24 h | imm. | 1 h | 24 h |
| HA 1 | AA 2 | 280 | 400 | 510 | 280 | 460 | 590 |
| HA 3 | AA 2 | 340 | 440 | 620 | 320 | 470 | 620 |
| HA 4 | AA 2 | 260 | 360 | 500 | 250 | 430 | 500 |
| HA 5 | AA 2 | 280 | 380 | 500 | 280 | 450 | 530 |
| HB 1 | AB 1 | 240 | 500 | 570 | 220 | 500 | 600 |

EXAMPLE 5
Emission Test

Pyrolyses were carried out at in each case 700° C. and 900° C. under nitrogen for a cold-box core according to the invention (100 pbw of quartz sand H 32, 1.0 pbw each of phenol resin solution HA 1 and polyisocyanate solution AA 1; cf. Examples 2 and 3 above) and a conventional cold-box core (100 pbw of quartz sand H 32, 1.0 pbw each of phenol resin solution HC 1 and polyisocyanate solution AC 1, for compositions see below). The amounts of phenol and toluene formed during the pyrolysis were determined by means of a gas chromatograph. The results are summarized in Table 3:

TABLE 3

| Sample | Temperature | Benzene | Toluene | Unit |
|---|---|---|---|---|
| HC 1/AC 1 | 700° C. | 3.300 | 0.739 | mg/4 g of core |
| | 900° C. | 3.289 | 0 | |
| HA 1/AA 1 | 700° C. | 1.581 | 0 | gm/4 g of core |
| | 900° C. | 2.444 | 0 | |

It can be seen that the benzene and toluene emission in the case of the system according to the invention were substantially lower than in the case of the conventional system.
Composition of cold-box resin solution HC 1:
 52.0 pbw of phenol resin (precondensate)
 20.0 pbw of Solvesso 100 ($C_8$–$C_{11}$ aromatics mixture)
 10.0 pbw of dinonyl phthalate
 10.0 pbw of dinonyl adipate
 7.7 pbw of isophorone
 0.3 pbw of aminosilane or amidosilane
Composition of cold-box polyisocyanate solution AC 1:
 85.0 pbw of diphenylmethane diisocyanate
 14.7 pbw of Solvesso 150 ($C_{11}$–$C_{13}$ aromatics mixture)
 0.3 pbw of acid chloride (additive for increasing the lifetime of the sand)

EXAMPLE 6
Gas Pressure Measurement

The gas pressure measurement according to the specification of H. Gerard Levelink et al., Giesserei 67 (1980) No. 5, page 110 "Untersuchungsverfahren" [Investigation methods] was carried out for a cold-box core according to the invention (100 pbw of quartz sand H 32, 0.8 pbw each of phenol resin solution HA 1 and polyisocyanate solution AA 1; cf. Examples 2 and 3 above) and a conventional cold-box core (100 pbw of quartz sand H 32, 0.8 pbw each of phenol resin solution HC 1 and polyisocyanate solution AC 1, for compositions see Example 5 above).

The test result is summarized in the attached gas pressure-time diagram (FIG. 1). From a comparison of the gas pressure curves, it is immediately clear that the cold-box core according to the invention (lower, thin line) has substantially better gas pressure development behaviour than the conventional comparison cold-box core (upper, bold line).

EXAMPLE 7
Preparation of Phenol Resin Solutions for the Polyurethane No-bake Process Resin solutions which have the composition shown below were prepared from the phenol resin (precondensate) according to Example 1 after the required refractive index value had been reached:
According to the invention: No-bake phenol resin solution 1
 55 pbw of phenol resin (precondensate)
 30 pbw of tetraethyl silicate
 14.7 pbw of DBE
 0.3 pbw of aminosilane
Conventional for comparison: No-bake phenol resin solution 2
 50 pbw of phenol resin (precondensate)
 28 pbw of DBE
 17 pbw of Hydrosol AFD$^R$ (mixture of high-boiling aromatics)
 0.3 pbw of aminosilane.

EXAMPLE 8
Preparation of Polyisocyanate Solutions for the No-bake Process

The following polyisocyanate solutions were prepared for the no-bake process:
According to the invention: No-bake polyisocyanate solution 1
 80 pbw of diphenylmethane diisocyanate
 20 pbw of tetraethyl silicate
Conventional for comparison: No-bake polyisocyanate solution 2
 80 pbw of diphenylmethane diisocyanate
 20 pbw of Solvesso 100 ($C_8$ to $C_{11}$ aromatics mixture)

EXAMPLE 9
Production of No-bake Test Specimens and Core Testing Thereof

Moulding mixtures of the following compositions were prepared from the no-bake phenol resin solutions and no-bake polyisocyanate solutions according to Examples 6 and 7 in a vibratory mixer:

According to the invention: No-bake mixture 1 (no-bake phenol resin solution 1, no-bake polyisocyanate solution 1)
- 100 pbw of quartz sand H 32
- 0.8 pbw of no-bake phenol resin solution 1
- 0.8 pbw of no-bake polyisocyanate solution 1
- 0.6 pbw of catalyst, based on no-bake phenol resin solution 1 (catalyst=phenylpropylpyridine)

Conventional for comparison: No-bake mixture 2 (no-bake phenol resin solution 2, no-bake polyisocyanate solution 2)
- 100 pbw of quartz sand H 32
- 0.8 pbw of no-bake phenol resin solution 2
- 0.8 pbw of no-bake polyisocyanate solution 2
- 0.6 pbw of catalyst, based on the no-bake phenol resin solution 2 (catalyst=phenylpropylpyridine)

The no-bake mixtures 1 and 2 were rammed in moulds and left to set. As can be seen from Table 4 below, mixture 1 had achieved initial hardening after 7 minutes and mixture 2 after 6 minutes; both mixtures had set after 9 minutes. After in each case 1 hour, 2 hours or 24 hours, the bending strengths of the set no-bake mixtures were determined according to VDG Data Sheet P 72 E of February 1996. The strength values determined are compared with one another in Table 4, it being evident that the strength values of mixture 1 according to the invention are all substantially better than the conventional mixture 2. Regarding workplace pollution, the statement made in Example 4 applies in a corresponding manner here too.

TABLE 4

BENDING STRENGTHS

| | Initial hardness achieved min. | Set min. | 1 h N/cm$^2$ | 2 h N/cm$^2$ | 24 h N/cm$^2$ |
| --- | --- | --- | --- | --- | --- |
| No-bake mixture 1 | 7 | 9 | 230 | 340 | 590 |
| No-bake mixture 2 | 6 | 9 | 170 | 260 | 600 |

Particularly low-odour moulds and cores can be produced from no-bake mixture 1.

Only a low level of fumes developed during casting of a mould produced from no-bake mixture 1 compared with casting of a mould produced from no-bake mixture 2.

EXAMPLE 10
Preparation of a Preferred Phenol Resin of the Benzyl Ether Type (Precondensate) for Use with Alkyl Silicate Oligomer In a reaction vessel equipped with condenser, thermometer and stirrer,
- 235.4 kg of phenol
- 235.4 kg of ortho-cresol
- 167.9 kg of paraformaldehyde
- 0.9 kg of zinc acetate were initially introduced. The condenser was set up for reflux.

The temperature was brought to 115° C. in the course of one hour and maintained up to a refractive index $n_D^{20}$ of 1.562.

The condenser was then converted for atmospheric distillation and the temperature was increased to 120° C. in the course of one hour, until a refractive index $n_D^{20}$ of 1.591 had been reached.

A vacuum distillation was then carried out up to a refractive index $n_D^{20}$ of 1.606. The yield was 85% of the raw materials used.

This phenol resin was used for the production of test specimens by the cold-box process and also for the production of test specimens by the polyurethane no-bake process.

EXAMPLE 11
Preparation of Cold-box Phenol Resin Solutions Using Alkyl Silicate Oligomer and Solvent Component A resin solution for the cold-box process, which had the composition shown below, was prepared from the phenol resin (precondensate) according to Example 10, after the required refractive index value had been reached:

Resin solution HA 6 according to the invention:
- 53 pbw of phenol resin precondensate from Example 10
- 21 pbw of Dynasil 40 (alkyl silicate oligomer: CAS 68412-37-3)
- 21 pbw of tetraethyl silicate (CAS: 78-10-4)
- 5 pbw of DBE

EXAMPLE 12
Preparation of Polyisocyanate Solutions for the Cold-box Process Using Alkyl Silicate Oligomer as a Solvent Component Polyisocyanate solution AA 3 according to the invention:
- 80 pbw of diphenylmethane diisocyanate
- 10 pbw of tetraethyl silicate
- 10 pbw of dioctyl adipate
- 0.2 pbw of acid chloride

EXAMPLE 13
Production of Cold-box Test Specimens and Core Testing Thereof

The foundry sand mixture shown in Table 5 below was prepared using the phenol resin and polyisocyanate solutions from Examples 11 and 12 by mixing in each case
- 100 pbw of quartz sand H 32
- 0.8 pbw of phenol resin solution HA 6
- 0.8 pbw of polyisocyanate AA 3 in a vibratory mixer.

The test specimens were produced according to the specification from Example 4. Table 5 corresponds in structure to Table 2a.

TABLE 5

Bending strengths

| Further processing of the mixture | | | | | | | | | | | | | | | | |
|---|---|---|---|---|---|---|---|---|---|---|---|---|---|---|---|---|
| Test time | | IMMEDIATE | | | 1 HOUR | | | A | | B | | C | D | E | | F | |
| Phenol resin | Polyisocyanate | imm. | 1 h | 2 h | imm. | 1 h | 2 h | 1 d | 2 d | 1 d | 2 d | * | * | 1 d | 2 d | 1 d | 2 d |
| HA 6 | AA 3 | 300 | 520 | 600 | 300 | 480 | 600 | 600 | 580 | 580 | 560 | 620 | 630 | 530 | 570 | 550 | 530 |

What is claimed is:

1. Two-component binder system consisting of a phenol resin component and a polyisocyanate component, the phenol resin component comprising a phenol resin having at least two OH groups per molecule and the polyisocyanate component comprising a polyisocyanate having at least two isocyanate groups per molecule, wherein at least the phenol resin component contains a solvent, and wherein at least one of the phenol resin component and the polyisocyanate component comprises a solvent selected from the group consisting of alkyl silicates, alkyl silicate oligomers and mixtures thereof.

2. Binder system according to claim 1, wherein the phenol resin component comprises a phenol resin of the benzyl ether type.

3. Binder system according to claim 1, wherein the polyisocyanate component comprises polymeric diphenylmethane diisocyanate.

4. Binder system according to claim 3, wherein more than half the isocyanate groups in the polyisocyanate component are assigned to polymeric diphenylmethane diisocyanate.

5. Binder system according to claim 1, wherein the solvent for the phenol resin component and optionally the solvent for the polyisocyanate component are at least essentially free of aromatic compounds.

6. Binder system according to claim 1, wherein the solvent for the phenol resin component and/or the polyisocyanate component comprises tetraethyl silicate.

7. Binder system according to claim 1, wherein the solvent for the polyisocyanate component comprises an alkyl silicate or alkyl silicate oligomer and a cosolvent, and wherein the mass ratio alkyl silicate or alkyl silicate oligomer to cosolvent is greater than 1:50.

8. Binder system according to claim 1, wherein the binder system comprises, as the predominant solvent for the polyisocyanate, a substance selected from the group consisting of alkyl silicates, alkyl silicate oligomers and mixtures thereof.

9. Binder system according to claim 8, wherein it comprises tetraethyl silicate as the sole solvent or predominant solvent component for the polyisocyanate or a mixture of tetraethyl silicate with one or more other alkyl silicates or alkyl silicate oligomers as the sole solvent or predominant solvent component for the polyisocyanate.

10. Binder system according to claim 9, characterized in that it comprises tetraethyl silicate as the sole solvent or predominant solvent component for the polyisocyanate, the mass ratio of polyisocyanate to tetraethyl silicate being between 95:5 and 65:35.

11. Binder system according to claim 1, wherein the solvent for phenol resin consists of (a) a substance which is selected from the group which comprises alkyl silicate, alykl silicate oligomers and mixtures thereof, and (b) a cosolvent, the mass ratio of the substance stated in (a) to the cosolvent being between 1:60 and 5:1.

12. Process for the production of foundry moulds or cores, comprising:

forming a two-component binder system consisting of a phenol resin component and a polyisocyanate component, the phenol resin component comprising a phenol resin having at least two OH groups per molecule and the polyisocyanate component comprising a polyisocyanate having at least two isocyanate groups per molecule, wherein at least the phenol resin component contains a solvent, and wherein at least one of the phenol resin component and the polyisocyanate component comprises a solvent selected from the group consisting of alkyl silicates, alkyl silicate oligomers and mixtures thereof, and mixing a molding material with said binder system to form a moulding mixture, and binding said molding mixture by means of said polyurethane-based binder system to form a foundry mold.

13. Process according to claim 12, wherein the phenol resin component comprises a phenol resin of the benzyl ether type.

14. Process according to claim 12, wherein the polyisocyanate component comprises polymeric diphenylmethane diisocyanate.

15. Process according to claim 12, wherein the solvent for the phenol resin component and optionally the solvent for the polyisocyanate component are essentially free of aromatic compounds.

16. Process according to claim 12, wherein the solvent for the phenol resin component and/or the polyisocyanate component comprises tetraethyl silicate.

* * * * *